US007017111B1

(12) United States Patent
Guyan et al.

(10) Patent No.: US 7,017,111 B1
(45) Date of Patent: Mar. 21, 2006

(54) INSURANCE FILE NOTE GENERATION METHOD AND SYSTEM

(75) Inventors: G. Victor Guyan, Bethlehem, PA (US); Peter L. Treacy, St. Paul, MN (US); Mark W. Moran, Evanston, IL (US); Amy N. Shaheen, Chicago, IL (US)

(73) Assignee: Accenture L.L.P., Chicago, IL (US)

( * ) Notice: Subject to any disclaimer, the term of this patent is extended or adjusted under 35 U.S.C. 154(b) by 0 days.

(21) Appl. No.: 09/550,499

(22) Filed: Apr. 14, 2000

(51) Int. Cl.
*G06F 17/00* (2006.01)
(52) U.S. Cl. .................. 715/512; 715/505; 715/506
(58) Field of Classification Search .............. 715/505, 715/506, 507, 508, 512, 537
See application file for complete search history.

(56) References Cited

U.S. PATENT DOCUMENTS 5,253,362 A * 10/1993 Nolan et al. ................ 707/1
5,404,295 A * 4/1995 Katz et al. ................... 707/2
5,523,942 A * 6/1996 Tyler et al. ................... 705/4
5,806,079 A * 9/1998 Rivette et al. ............ 715/512
5,950,169 A * 9/1999 Borghesi et al. ............. 705/4
6,389,434 B1 * 5/2002 Rivette et al. ............ 715/512

* cited by examiner

*Primary Examiner*—Steven Hong
(74) *Attorney, Agent, or Firm*—Brinks Hofer Gilson & Lione (57) ABSTRACT

Methods and systems consistent with the principles of the present invention automatically generate file notes for insurance claims using predefined text to complete each file note. A claim folder interface creates detailed claims and provides suffixes and participants to a file note interface. The file note interface displays file notes with prefilled suffix and participant fields as well as selectable items in a category and subcategory field. Moreover, methods and systems consistent with the present invention, enable a claim handler to select a selectable category and subcategory and provide short text associated with the selection in a predefined text area. In addition, a larger text area may also be provided to capture any free form text.

21 Claims, 8 Drawing Sheets

INSURANCE FILE NOTE GENERATION METHOD AND SYSTEM

BACKGROUND OF THE INVENTION

A. Field of the Invention

This invention relates generally to data processing systems and, more particularly, to the entry of file notes for claims by insurance handlers.

B. Description of the Related Art

These days computers are essential to all businesses and business industries. The computer has transformed not only the way businesses interface with consumers, but also the way businesses function internally. For example, computers can reduce transaction costs, manage data, create reports, and increase overall efficiency of a business. Without the computer, most businesses, if not all businesses could not keep up with the changing times.

The insurance industry is an example of one business industry that has come to rely on the computer for a multitude of tasks. For example, insurance claim handlers use computers to capture data relating to insurance claims. Currently, the handlers use free form file notes and claim files to capture the data. Free form file notes are a computerized version of handwritten notes and usually contain data reflecting facts and/or events relating to various aspects of an insurance claim. Computer programs that capture data for these free forms typically reside on a large computers (e.g., mainframe computer) and use rudimentary graphical user interfaces. These programs can store information, such as the date and time that the claim is entered, a category for a claim (e.g., medical, auto, rental), and any additional file notes inputted by the handler for the claim. The free form computer programs enable insurance handlers to provide any information the handler determines to be important to the claim.

Thus, the free form file note creates inconsistent claims as prepared by the claim handlers. Many times, claim handlers, although entering the same information into file notes, enter the information using their own style. For example, one handler may indicate auto damages as "auto dam.=$15 k" while another handler may indicate auto damages in the file notes as "damages to car approx. 15 thousand." Although both sets of free form file notes are complete, performing any analysis on the data in impossible. In fact, even though handlers generally enter in the same information over and over, and the information does not change from one handler to the next handler, the way the information is entered is inconsistent and not standardized.

Although the above mentioned computer programs enable handlers to input free form file notes pertaining to insurance claims using a computer, they are too flexible and therefore do not provide structure to file notes and/or claim files. There is therefore a need to automatically generate file notes for insurance claims, such that the file notes are similarly structured, and information in each file note may be easily located and/or modified.

SUMMARY OF THE INVENTION

Methods and systems consistent with the principles of the present invention automatically generate file notes for insurance claims using predefined text to complete each file note. A claim folder interface creates detailed claims and provides suffixes and participants to a file note interface. The file note interface displays file notes with prefilled suffix and participant fields as well as selectable items in a category and subcategory field. Moreover, methods and systems consistent with the present invention, enable a claim handler to select a selectable category and subcategory and provide short text associated with the selection in a predefined text area. In addition, a larger text area may also be provided to capture any free form text.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Introduction

Methods and systems consistent with the principles of the present invention automatically generates file notes for insurance claims. Such methods and systems enable rapid generation of text representing file notes since claim handlers need only "point" and "click" to create the file note. The handler enters in short text in predefined text area to complete the file note.

A claim handler may use a file note interface to view, or modify existing file notes. In addition, a claim handler may use a claim folder interface to create claims for incidents (e.g., car accident, lost jewelry, house fire), and provide information associated with the claim to the file note interface.

An insurance claim is broadly defined as a request by a claimant to be reimbursed by an insurance company for a loss. For example, a claimant may file a claim regarding a car accident (e.g., medical injury claim), lost jewelry, or a house fire (e.g., cost to refurnish the house). Claims may be stored in a claim database as a claim folder. Each claim folder is stored as a record in the claim database. The claim database may be a relational database containing all information relating to each claim, including any associated file notes. The claim database may use well known database system, such as the ORACLE database system, available from ORACLE, Corp.

The claim folder is a high level organizational view of a claim. The claim folder contains information regarding each participant in the claim (e.g., driver of both cars, house residents), available suffixes, information relating to the insured's policy, and other information necessary to process claims. A suffix is broadly defined as any applicable coverage from an insurance policy for the claim. Though insurance policies have many coverages (e.g., rental, collision, bodily injury), only a few of the coverages are related to any one claim. Thus, when a claimant files the claim, the insurance policy is applied to the loss, and each applicable coverage on the policy is labeled a suffix.

For example, an insured person may have both collision and medical payment policy coverages with different limits. If the insured person is involved in an accident, a collision suffix may be created in the claim folder to cover any losses related to vehicle damage. In addition, a medical payment suffix may be created in the claim folder to cover losses related to their medical expenses incurred as a result of the accident. Payments made by the insurance company may be tracked on a suffix by suffix basis so that preset spending limits are applied appropriately.

Additionally, the claim folder contains file notes pertaining to each suffix and participant. File notes provide additional documentation for claims by capturing information that is not captured as data elements within the claim folder. Additionally, data that is documented many times across multiple suffixes may be captured quickly, and in a standard format by using file notes, thus providing consistency across claims. Since file notes are generated using standardized and/or free form text, file notes may be indexed in the claim database by participant or by suffix. File notes may also be used as internal communication between claim handlers, vendors, and even insurance companies. In one example, in the case of an automobile collision, a file note may contain information relating to the cost of repair, hours worked, and number of days to repair. In another example, a file note may include the amount of medical bills.

Methods and systems consistent with the present invention enable claim handlers the ability to capture standard text quickly and efficiently. Moreover, by automatically generating file notes, a claim handler's thought process may be streamlined when updating claim folders, or investigating, evaluating, or resolving the claim. By automatically generating file notes for the handler, most, if not all, file notes are easily searchable when stored in the claim database since fields are automatically populated for the handler (e.g., suffix, participant). Additionally, since most, if not all, of each file note is already preformatted, the insurance company obtains a benefit of having consistent verbiage from multiple claim handlers. That is, methods and systems consistent with the present invention reduce the number of acronyms and/or cryptic notes that would otherwise be used by the handler.

Claim Interfaces

FIGS. 1A–1D depict exemplary interfaces for use with methods and systems consistent with the present invention. Such interfaces may be displayed to claim handlers. The interfaces may be any type user interface, such as a Web interface, or a Visual Basic interface capable of displaying information. A Web interface may include software, such as the well-known APACHE web server. The interfaces enable handlers to view, create, or modify file notes.

Figure 1A:
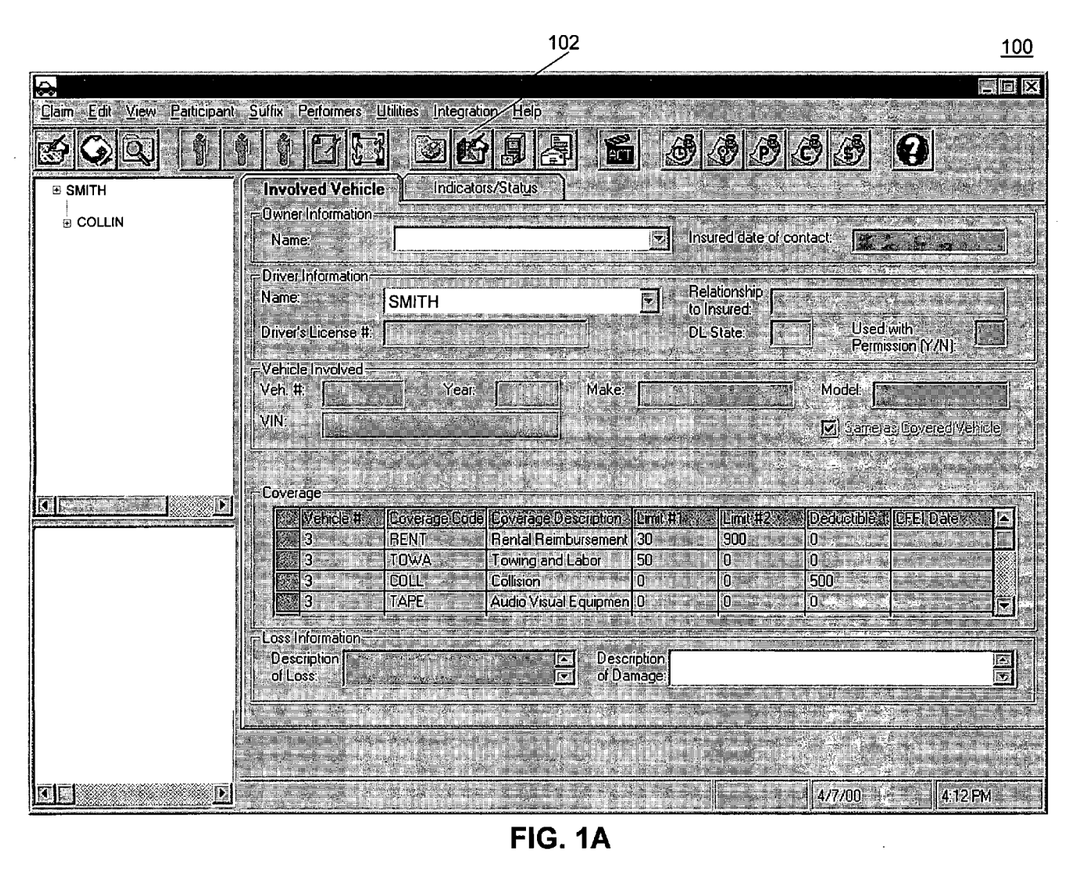
FIGS. 1A–1D depict exemplary interfaces for use with methods and systems consistent with the present invention.

FIG. 1A depicts an exemplary claim folder interface 100 for use with method and systems consistent with the present invention. Claim folder interface 100 presents to the handler a high level interface regarding the instant claim, such that the handler can easily identify participants, claimants, vehicles involved, drivers, and any related suffixes (e.g., rental, collision, bodily injury, medical).

Figure 1B:
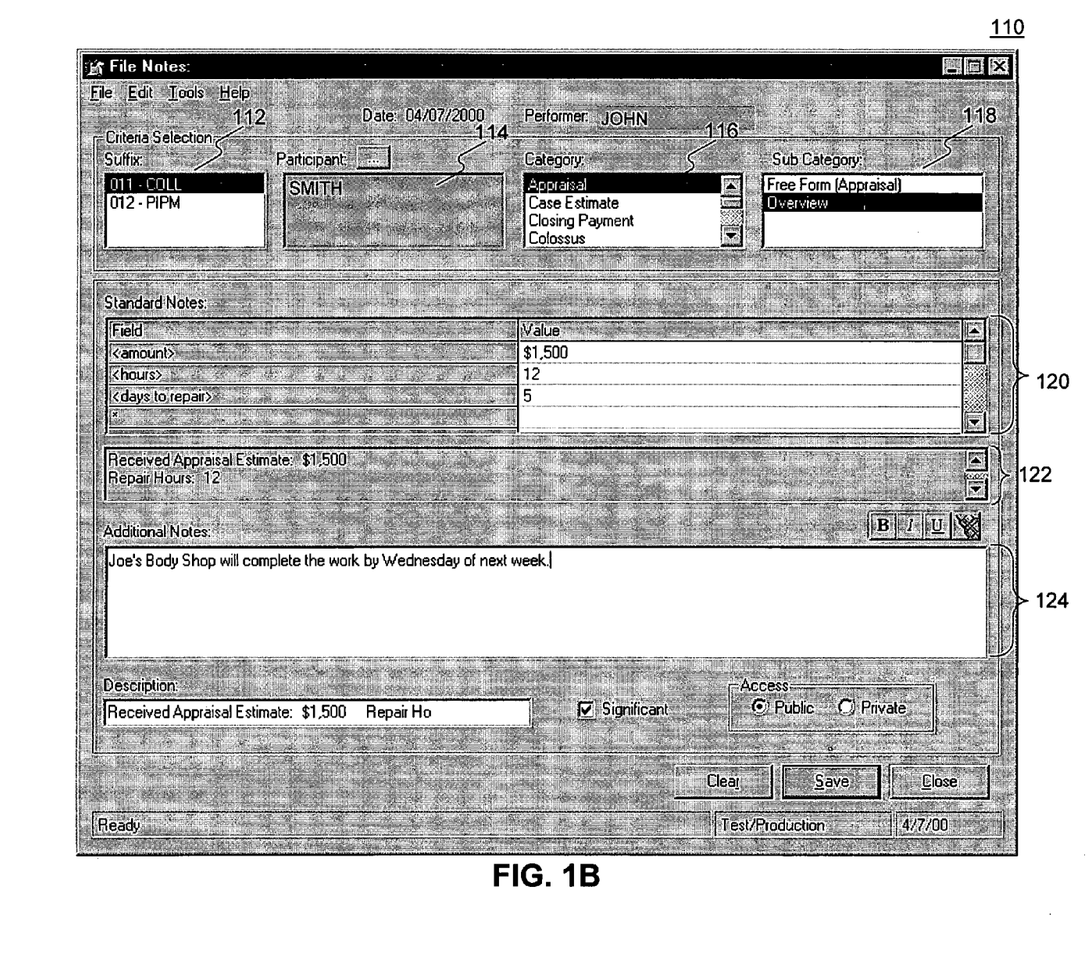

As explained, a claimant is a person who files a claim against an insurance company. A participant is an entity involved in the claim (e.g., police, towing company, doctor). A suffix is an event or coverage type relating to the instant claim. An insured person may be the participant as well as the claimant. Claim folder interface 100 also contains a button 102 linking each suffix and participant to a file note interface 110.

FIG. 1B depicts an exemplary file note interface 110. File note interface 110 contains suffix and participant data obtained from claim folder interface 100 placed in a suffix field 112 and a participant field 114. Suffix field 112 may be a combinational box or a list box and lists all suffixes for the claim. Participant field 114 may also be a combinational box or list box and displays the name of a participant for each suffix in suffix field 112. When a handler selects button 102 to initiate the creation of a new file note 110, the data highlighted in claim folder interface 100 (suffix and participant) is loaded in suffix field 112 and participant field 114.

Category field 116 is a selection list box (multiple or single) and includes available categories for the claim pertaining to a highlighted suffix in suffix field 112 and participant in participant field 114, such as litigation, investigation, facts, liability, damages, medical appraisal, or case estimate. Categories correspond to the captioned reports that handlers may consider during a review of a claim, and are specific to the type of claim and suffix being reported by handler. Subcategory field 118 is a combinational box and includes subcategories reflecting options for each category, such as referral, recovery, update, initial contact, case evaluation. Each subcategory in subcategory field 118 relates to a predefined text field 120. Predefined text field 120 is a spreadsheet control and displays the names of the fields in one column and allows the handler to enter values for the appropriate field in a corresponding cell in the next column.

A free form subcategory enables a handler to enter non-standard text without regard to formatting. For example, if the free form subcategory is selected in subcategory field 118, the handler may enter text only in file note area 124.

File note interface 110 provides a novel way for handlers to create file notes consistently and effortlessly. Both category field 116 and subcategory field 118 may be search criteria when the handler searches for file notes at a later time. Moreover, file note interface 110 provides a standardized interface for the handler to be consistent.

Figure 1C:
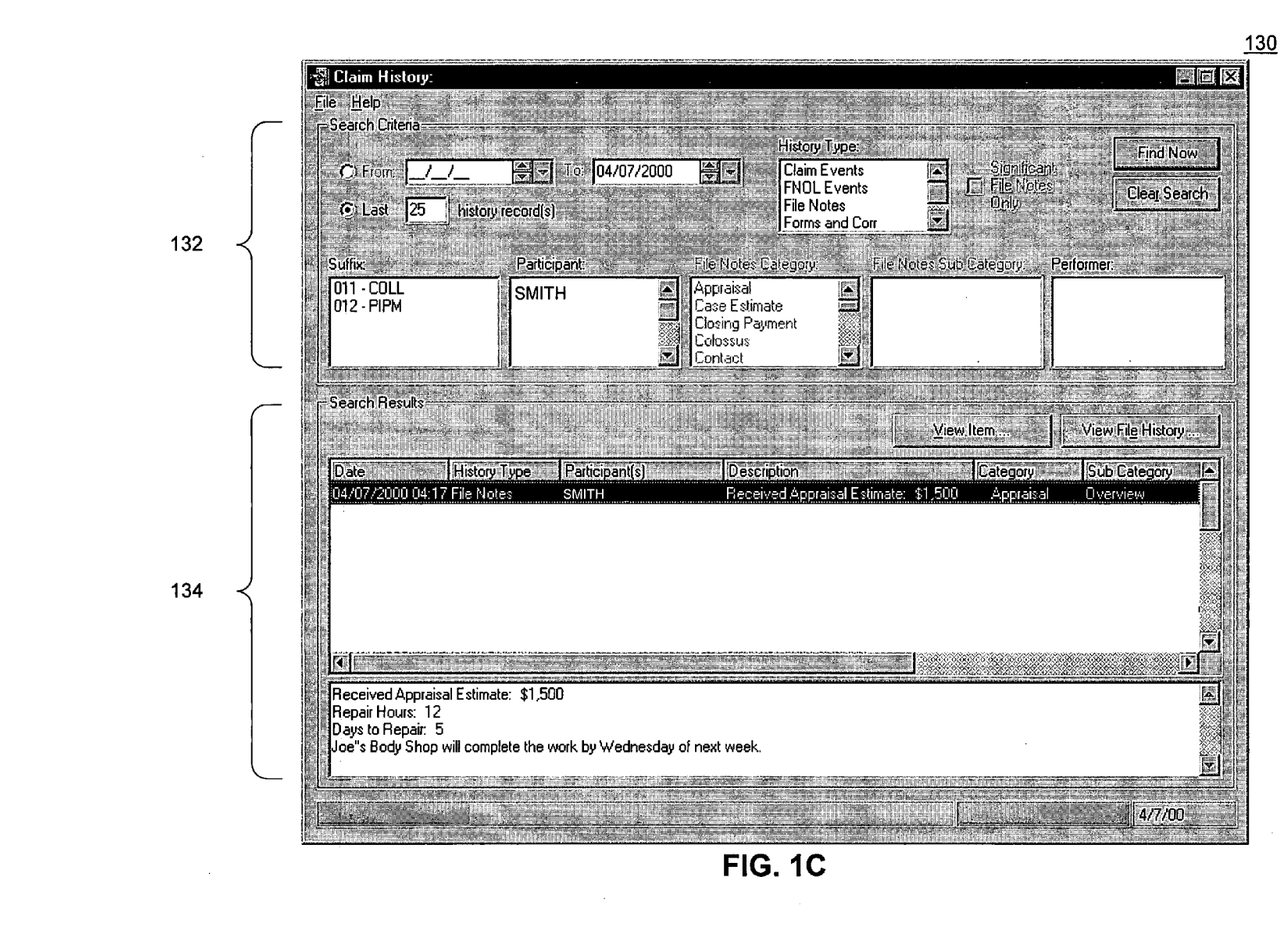

FIG. 1C depicts an exemplary claim history interface 130 consistent with methods and systems of the present invention. Claim history 130 provides a convenient way to search for filed file notes in the claim database.

Figure 1D:
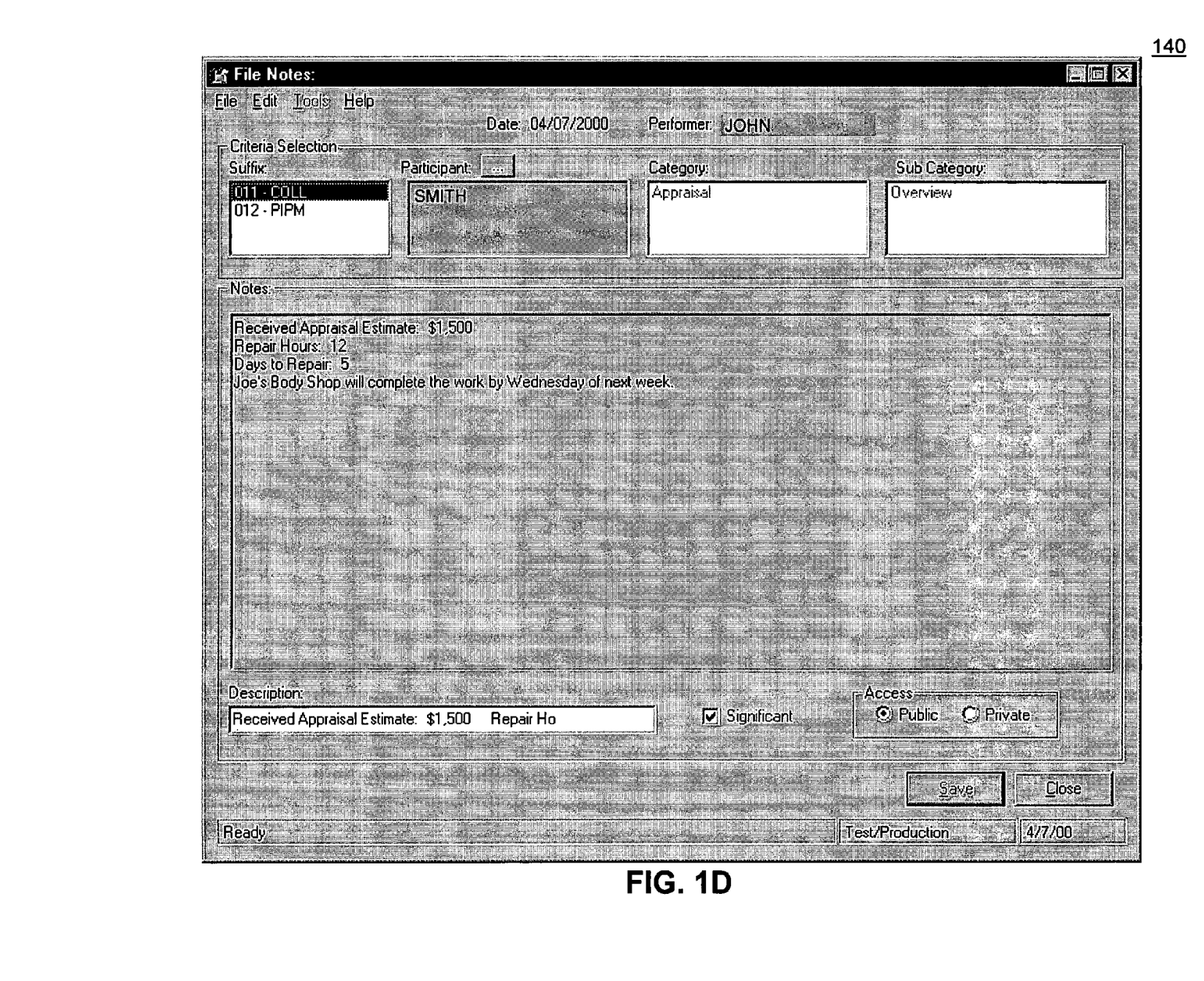

FIG. 1D depicts an exemplary file note view interface 140 for use with methods and systems consistent with the present invention. File note view interface 140 may be used to add or modify file notes. Many fields in file note view interface 140 are updateable through file note view 140, such as suffix field 112 or participant field 114. However, for integrity and/or security purposes, once a file note is saved using file note interface 110 predefined text and free form areas may not be changed.

New File Note

Figure 2:
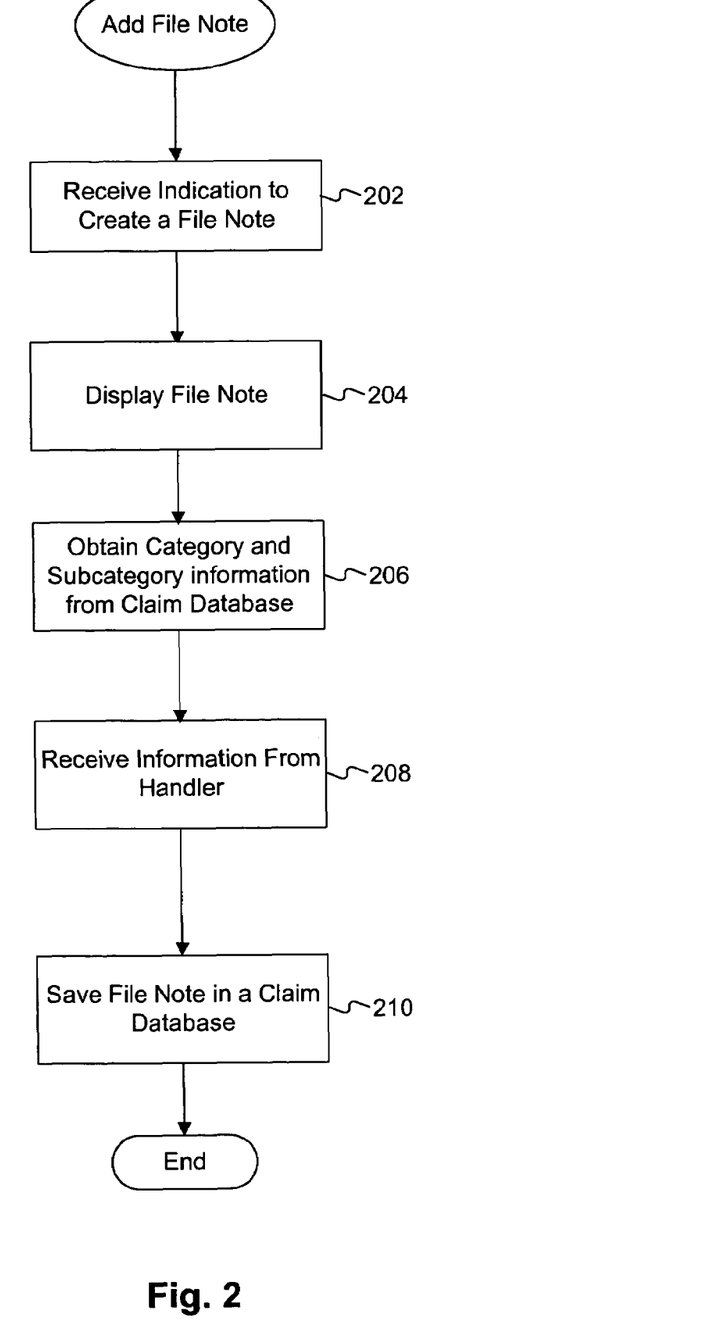
FIG. 2 depicts a flow chart of steps performed when generating a new file note consistent with the principles of the present invention.

FIG. 2 depicts a flow chart of the steps performed when creating and adding a file note to the claim database. The process begins by receiving an indication from the handler to include a file note for a particular suffix and participant in the claim folder interface 110 (step 202). The handler may highlight a suffix and participant and then selects button 102. In doing so, a file note interface 110, with suffix field 112 and participant field 114 already filled out, is displayed to the handler (step 204). For example, if a handler has completed the collision suffix in claim folder interface 100 for the driver and determines that a file note is needed, the handler may highlight the collision suffix in claim folder interface 100, and initiate file note interface 110.

Once file note interface 110 including the prefilled information is displayed to the handler, data for category field 116 and subcategory field 118 may be obtained from the claim database (step 206). The category and subcategory data is obtained from the claim database and placed in the fields 116, 118 respectively. Next, the handler may provide information to complete the file note (step 208). First, the handler may select a category and a subcategory from fields 116 and 118. Once selected, the handler may add data to predefined text area 120 and/or file note area 124. Based on the subcategory selected in subcategory field 118, predefined text area 120 contains fields so that the handler may enter in short text. This way, standardized file notes are generated. The short text may be entered using a table in predefined text area 120. The table has different fields, based on the subcategory chosen by the handler. Thus, if the handler chooses a different subcategory in subcategory field 118, a new predefined data area 120 with a new table is displayed. The results of the predefined text area 120 are displayed in a readable format in output area 122.

In addition to entering in standardized notes according to the predefined text area 120, the handler may add free form notes in file note area 124. Moreover, in addition to areas 120 and 124, a handler may indicate whether the instant file note is significant. However, the instant file note may already be indicated as significant based on a subcategory previously selected by the handler in subcategory area 118. Significant file notes are those file notes that are important highlights in the life of the claim.

The information inputted in predefined text area 120 and file note area 124 by the handler is combined into a file note and saved in a claim database (step 210). Once saved, the file note may remain open to receive additional file notes for the selected suffix 112 and participant 114. Once all associated file notes have been entered and stored in a claim database, the file notes may be viewed using a file note view interface 140.

View File Notes

Figure 3:
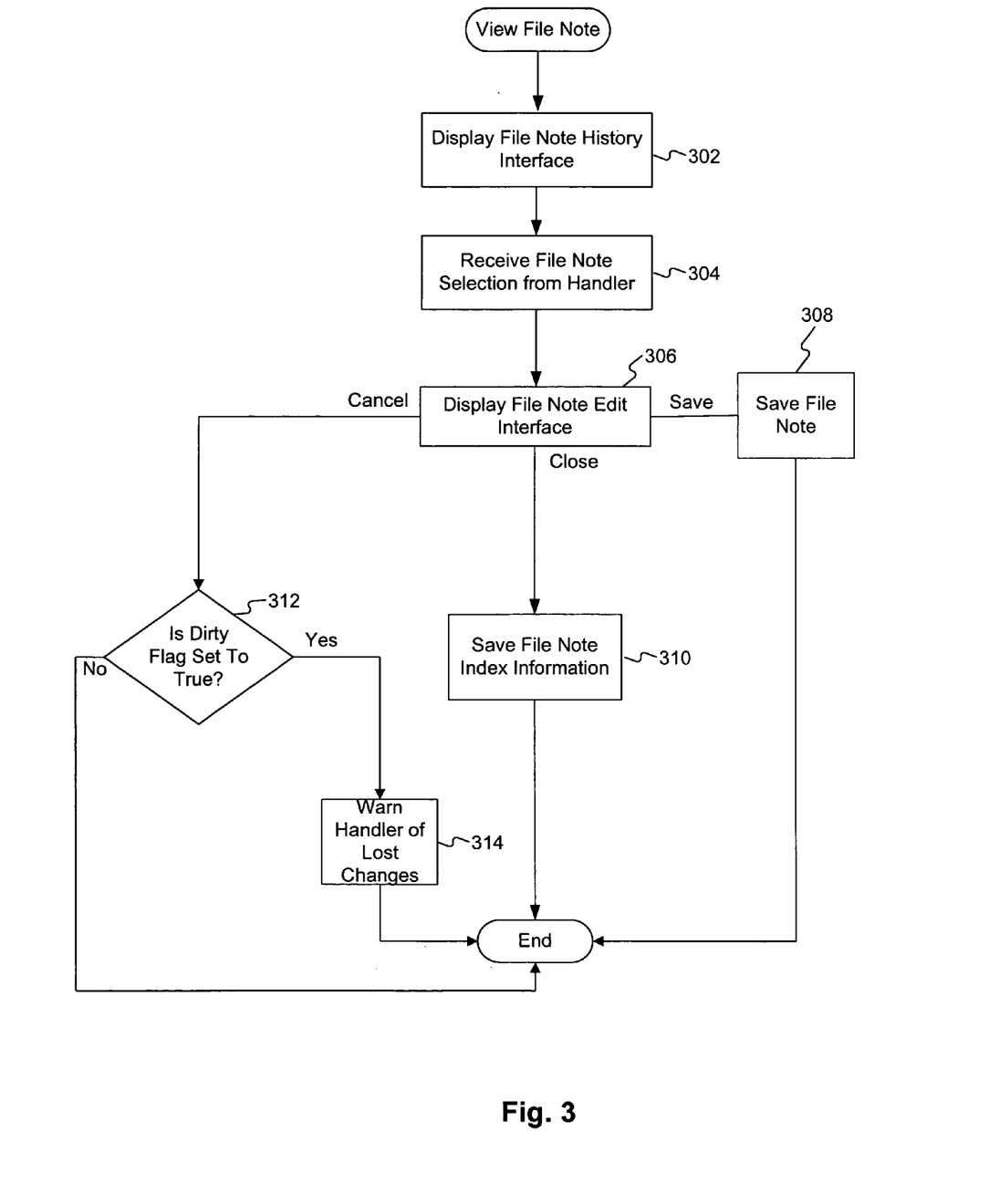
FIG. 3 depicts a flow chart of steps performed when viewing generated file notes consistent with the principles of the present invention.

FIG. 3 depicts a flow chart of steps performed when providing a file note history interface 130 and a file note edit interface 140 to the handler. First, file note history interface 130 is displayed to the handler (step 302). Using history interface 130, a handler may search for file notes using search criteria 132. The search results are displayed in search results section 134. The handler may select a file note from search result section 134 (step 304). Once a file note is selected, view file note interface 140 is displayed (step 306). The handler may then add or modify the contents of the file note by selecting a corresponding button in the interface. However, the handler may not change the category, subcategory or note area box. As explained above, this is to ensure the integrity of the file note.

If the handler chooses to save the file note (step 308), the file note index information is updated in the claim database to reflect the changes to the file note. If the handler chooses to close without making any changes to the file note (step 310), the file note index information is also updated in the claim database to reflect no changes. The handler may also choose to cancel any pending changes to the file note (step 312). File note edit interface 140 uses a "dirty flag" to indicate that changes have been made. If the dirty flag is true (e.g., changes have been made), file note edit interface 140 may display a dialog box indicating that any changes to the pending file note may be lost (step 314). If the dirty flag is false, then the file note is not updated in the claim database.

Computer System

Figure 4:
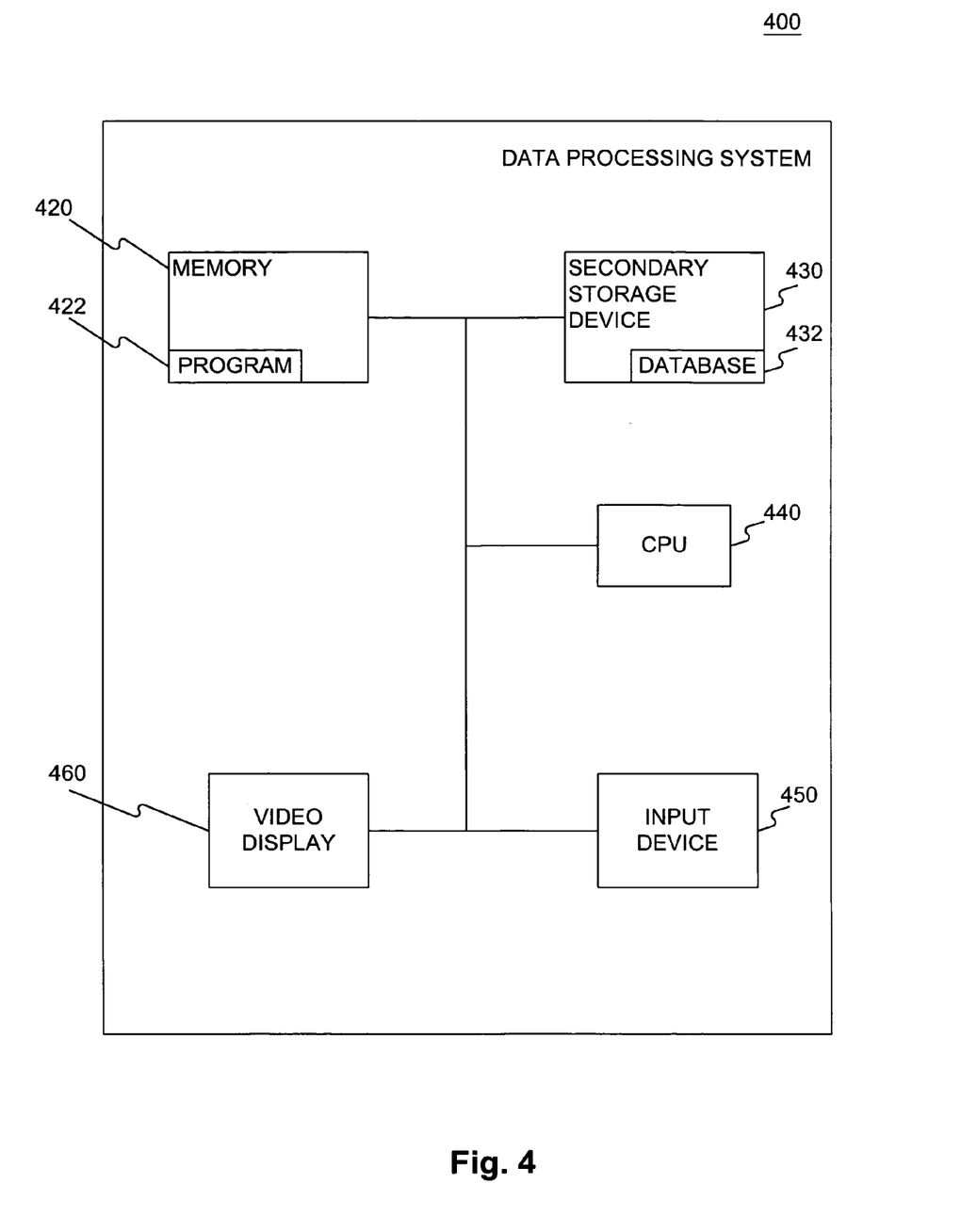
FIG. 4 depicts a block diagram of a data processing system in which interfaces consistent with the present invention may be implemented.

FIG. 4 illustrates an architecture for a data processing system 400 with which methods and systems consistent with the present invention may be implemented. The exemplary computer system of FIG. 4 is for descriptive purposes only and is not intended to limit application of method and systems consistent with the present invention to use with a particular architecture. Although the description may refer to terms commonly used in describing particular computer systems, such as in a personal computer, the description and concepts equally apply to other computer systems such as network computers, workstations, and mainframe computers having architectures that may be different from the architecture shown in FIG. 4.

Data processing system 400 includes a memory 420, a secondary storage device 430, a central processing unit ("CPU") 440, an input device 450 and a video display 460. Those skilled in the art will appreciate that computer system 400 may contain additional components. Memory 420 of computer system 400 includes program 422 for generating interfaces 100, 110, 130, and 140 in video display 460 and for automatically generating file notes. As an example, program 422 may be written in the Visual Basic programming language. Consistent with one implementation of the invention, file notes are generated and stored in a claim database 432 located in secondary storage device 430 in response to CPU 440 executing one or more sequences of one or more instructions of program 422 contained in memory 420.

Figure 5:
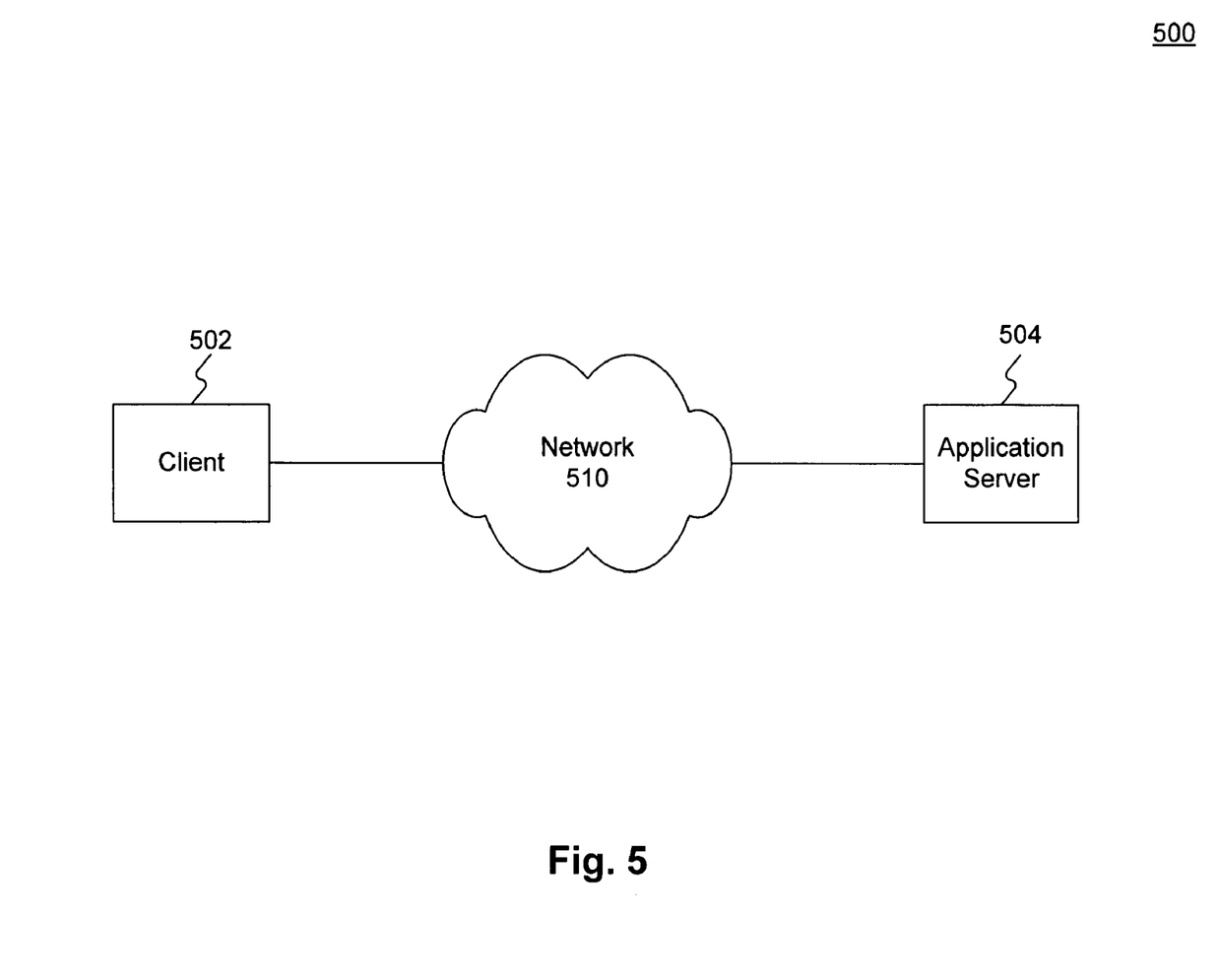
FIG. 5 depicts an exemplary computer network suitable for practicing methods and systems consistent with the principles of the present invention.

FIG. 5 depicts an alternative file note generation system 500 suitable for practicing methods and systems consistent with the present invention. System 500 comprises a client computer 502 and an application server 504, linked together through network 510. Application server 504 contains file note software (not shown). An insurance handler may use client computer 502 to receive and transmit information to application server 504.

Client computer 502 may contain a browser that allows users to interact with application server 504 by transmitting and receiving files, such as Web pages. A web page may include images or textual information to provide an interface to receive identification information from a user using hypertext markup language (HTML), Java, or other techniques. An example of a browser suitable for use with methods and systems consistent with the present invention is the NETSCAPE NAVIGATOR browser, from NETSCAPE.

Application server 504 may contain a file note program to transmit interfaces (e.g., file note, history, and claim folders) to client computer 502, and to automatically generates file notes with consistent verbiage. Application server 504 may also contain a secondary storage device (not shown) to store the claims and file notes.

CONCLUSION

As described, methods and systems consistent with the present invention automatically generate file notes for insurance claims using predefined text to complete each file note.

Although aspects of the present invention are described as being stored in a memory, one skilled in the art will appreciate that these aspects may be stored on or read from other computer readable media, such as secondary storage devices, like hard disks, floppy disks, and CD-ROM; a carrier wave received from a network like the Internet; or other forms of ROM or RAM. Additionally, although specific components and programs of system 400 have been described, those skilled in the art will appreciate that system 400 may contain additional or different components or programs.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone.

What is claimed is:

1. A method for generating a file note for an insurance claim, comprising the steps of, executed in a data processing system, of:
   prefilling a first set of fields with information identifying a file note, said information comprising at least one suffix indicating a type of insurance coverage for a participant in a claim and identification of the participant, wherein the at least one suffix is preselected from one or more types of insurance coverage applicable to the claim;
   obtaining a selection of fields of a first set of fields from a user, the selection identifying information for a second set of fields;
   displaying in the second set of fields, the information identified by selection of field of the first set of fields;
   permitting the user to add data to a predefined text area related to each field of the second set of fields based on the selected fields;
   generating a file note that contains the first set of fields, the second set of fields, and the data in the predefined text area;
   identifying a level of significance of the file note; and
   storing the file note with the identified level of significance in a claim database including file notes associated with the claim.

2. The method of claim 1, further comprising the step of storing, in a claim database, the generated file note.

3. The method of claim 1, wherein the data is short text, and where the predefined text area includes a table of variables and a corresponding field that receives short text for each variable.

4. The method of claim 1, wherein permitting the user to add data further comprises the step of permitting the user to add free form notes in a file note area.

5. The method of claim 4, further comprising the steps of:
   combining the file note area and the predefined text area; and
   storing, in a database, the combined area as a file note.

6. The method of claim 1, further comprising the step of obtaining from the user an indication of whether the file note is significant.

7. The method of claim 1, wherein the second set of fields includes a category and a subcategory.

8. The method of claim 1, wherein the first set of fields include a suffix field and a participant field, wherein the suffix field indicates the type of insurance coverage, and wherein the participant field indicates an entity involved with the claim.

9. A method for generating a file note for an insurance claim folder, comprising:
   providing on a display device a claim folder screen depicting attributes associated with a claim, the attributes comprising at least one suffix indicating a type of insurance coverage for a participant in the claim;
   permitting the selection of at least one attribute associated with a claim on the claim folder screen;
   providing on a display device a file note screen depicting the selected at least one attribute in a criteria section, and a text entry section, wherein the text entry section is based on the selected at least one attribute in the criteria section;
   receiving from a user information associated with the text entry section;
   generating the file note based on information received from the user;
   identifying a level of significance of the file note according to information received from the user; and
   storing the file note with the identified level of significance in a searchable claim database, the claim database associating the file note being with a file note index indicating changes to the file note.

10. The method of claim 9, wherein the criteria section contains a selected suffix and a selected participant, wherein the suffix and the participant are selected by a user in the claim folder screen, and wherein the criteria section further contains a category and subcategory field containing categories and subcategories selectable by the handler.

11. The method of claim 10, wherein the categories and subcategories are based on the suffix, participant, or the claim.

12. The method of claim 9, wherein the file note screen further comprises a free form note section containing a text area.

13. A system for generating a file note for an insurance claim, comprising:
   prefilling means for prefilling a first set of fields with information identifying a file note, said information comprising at least one suffix indicating a type of insurance coverage for a participant in a claim and identification of the participant, wherein the at least one suffix is preselected from one or more types of insurance coverage applicable to the claim;
   obtaining means for obtaining a selection of fields of a first set of fields from a user, the selection identifying information for a second set of fields;
   displaying means for displaying in the second set of fields, the information identified by selection of field of the first set of fields;
   permitting means for permitting the user to add data to a predefined text area related to each field of the second set of fields based on the selected fields;
   generating means for generating a file note that contains the first set of fields, the second set of fields, and the data in the predefined text area; and
   identifying means for identifying a level of significance of the file note; and storing means for storing the file note with the identified level of significance in a claim database including file notes associated with the claim.

14. The method of claim 13, further comprising a claim database, wherein the database stores the generated file note.

15. The system of claim 13, wherein the data is short text, and where the predefined text area includes a table of variables and a corresponding field that receives short text for each variable.

16. The system of claim 13, wherein the permitting means further permits the user to add free form notes in a file note area.

17. The system of claim 16, further comprising:
combining means for combining the file note area and the predefined text area; and
a database for storing the combined area as a file note.

18. The system of claim 13, further comprising obtaining means for obtaining an indication of whether the file note is significant.

19. The system of claim 13, wherein the second set of fields includes a category and a subcategory.

20. The system of claim 13, wherein the first set of fields include a suffix field and a participant field, wherein the suffix field indicates the type of insurance coverage, and wherein the participant field indicates a participant to the claim.

21. The system of claim 13, further comprising the display means for displaying a file note interface screen containing the first set of fields, the second set of fields, and the predefined text area.

* * * * *